(12) United States Patent
Harada et al.

(10) Patent No.: US 12,458,476 B2
(45) Date of Patent: Nov. 4, 2025

(54) ZIRCONIA SINTERED BODY

(71) Applicant: KURARAY NORITAKE DENTAL INC., Kurashiki (JP)

(72) Inventors: Shinji Harada, Aichi (JP); Yoshihisa Yamada, Aichi (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 608 days.

(21) Appl. No.: 17/414,112

(22) PCT Filed: Dec. 16, 2019

(86) PCT No.: PCT/JP2019/049251
§ 371 (c)(1),
(2) Date: Jun. 15, 2021

(87) PCT Pub. No.: WO2020/129918
PCT Pub. Date: Jun. 25, 2020

(65) Prior Publication Data
US 2022/0047364 A1 Feb. 17, 2022

(30) Foreign Application Priority Data
Dec. 19, 2018 (JP) .................. 2018-237669

(51) Int. Cl.
*A61C 13/083* (2006.01)
*A61C 5/70* (2017.01)
(Continued)

(52) U.S. Cl.
CPC .............. *A61C 13/083* (2013.01); *A61C 5/70* (2017.02); *C04B 35/486* (2013.01); *C04B 35/64* (2013.01);
(Continued)

(58) Field of Classification Search
CPC ..... A61C 13/083; A61C 13/091; A61C 13/08; A61C 5/70; C04B 35/486; C04B 35/64;
(Continued)

(56) References Cited

U.S. PATENT DOCUMENTS 3,502,466 A * 3/1970 Vickery .................... B22F 3/10
419/36
2004/0241614 A1 12/2004 Goldberg et al.
(Continued)

FOREIGN PATENT DOCUMENTS

JP 2014-218389 A 11/2014
JP 2014-534018 A 12/2014
(Continued)

OTHER PUBLICATIONS

Fujisaki H, CN-106660885-A, Machine translation (Year: 2017).*
(Continued)

*Primary Examiner* — Eric J Rosen
*Assistant Examiner* — Mirayda A Aponte
(74) *Attorney, Agent, or Firm* — Oblon, McClelland, Maier & Neustadt, L.L.P.

(57) ABSTRACT

A zirconia sintered body may have less excess material to be removed when making a prosthesis by milling, and may provide a reduction of work time, more durability for a working tool, and a faster treatment for patients, and may undergo little deformation during firing, and provide enhanced aesthetics. A columnar zirconia sintered body may have a base and a side face, the base having a surface shape that is neither square nor rectangular but has at least one straight portion.

19 Claims, 4 Drawing Sheets

(51) Int. Cl.
*C04B 35/486* (2006.01)
*C04B 35/64* (2006.01)
*C04B 111/00* (2006.01)

(52) U.S. Cl.
CPC ............ *C04B 2111/00836* (2013.01); *C04B 2235/3246* (2013.01); *C04B 2235/9661* (2013.01)

(58) Field of Classification Search
CPC .............. C04B 35/48; C04B 35/01; C04B 2111/00836; C04B 2235/3246; C04B 2235/9661; C04B 2235/02; C04B 33/32; C04B 2111/00474; B22F 2003/1042; B22F 2003/1046; B22F 3/10
USPC ...................................................... 433/202.1
See application file for complete search history.

(56) References Cited

U.S. PATENT DOCUMENTS

| | | | |
|---|---|---|---|
| 2013/0221554 A1* | 8/2013 | Jung | ................... A61C 13/083 264/16 |
| 2014/0328746 A1 | 11/2014 | Yamada et al. | |
| 2014/0356815 A1 | 12/2014 | Spalt et al. | |
| 2016/0081777 A1 | 3/2016 | Yamada et al. | |
| 2017/0035537 A1* | 2/2017 | Leeson | ................. A61C 13/083 |
| 2017/0156828 A1 | 6/2017 | Leeson et al. | |
| 2017/0189146 A1 | 7/2017 | Volkl et al. | |
| 2018/0002235 A1 | 1/2018 | Ito et al. | |

FOREIGN PATENT DOCUMENTS

| | | |
|---|---|---|
| JP | 2017-46794 A | 3/2017 |
| JP | 2017-77454 A | 4/2017 |
| WO | WO 2016/104724 A1 | 6/2016 |

OTHER PUBLICATIONS

Kitamura et al., JP-H09238957-A, Manufacture of Dental Prosthesis and Material for Processing the Same, (Year: 1997).*

International Search Report issued on Mar. 3, 2020 in PCT/JP2019/049251 filed on Dec. 16, 2019, 2 pages.

Extended European Search report issued Aug. 11, 2022 in European Patent Application No. 19898795.0, 10 pages.

* cited by examiner

9

A  B  C

ZIRCONIA SINTERED BODY

CROSS-REFERENCE TO RELATED APPLICATIONS

The present application is the national stage of international application PCT/JP2019/049251, filed on Dec. 16, 2019, and claims the benefit of the filing date of Japanese Appl. No. 2018-237669, filed on Dec. 19, 2018.

TECHNICAL FIELD

The present invention relates to a zirconia sintered body. The present invention also relates to a dental restoration made of a zirconia sintered body, and to a zirconia pre-sintered body.

BACKGROUND ART

For aesthetics and safety, ceramic materials such as zirconium oxide (zirconia) are used as alternative materials of metals in fabrication of dental products. The demand is particularly high for zirconia because of its desirable strength and relatively superior aesthetics, especially with the currently declining price of this material.

A pre-sintered body of zirconia is used when forming dental products such as dentures, prosthetic crowns, and bridges using a milling technique employing CAD/CAM. A pre-sintered body of zirconia, which is cuboidal in shape, is cut into a dental product (e.g., a denture, a prosthetic crown, or a bridge) by being machined from sides to remove material and form the desired shape.

Zirconia sintered bodies that are currently available have high strength, and cause the machining tool to quickly fail when directly machined. Because this is not commercially viable, the fabrication of a dental product (e.g., a prosthesis) from a zirconia sintered body uses a pre-sintered block of incompletely sintered zirconia particles. The pre-sintered block is machined into a compact having a shape of a prosthesis, and the compact fabricated from the pre-sintered body is fired under firing conditions to obtain a prosthesis made of the zirconia sintered body.

However, the traditional method of fabricating a prosthesis from a zirconia sintered body involves the following issues. When treating a patient with a prosthesis made of a zirconia sintered body, a dentist diagnosing the patient first determines the shape of prosthesis. A dental technician then molds a pre-sintered body of zirconia into the specified shape provided by the dentist, and fabricates a zirconia sintered prosthesis by firing the compact. However, firing of a pre-sintered body of zirconia into a zirconia sintered body requires a temperature of, for example, at least 1,400° C. Because firing at such high temperature requires both time and equipment, completing the whole procedure from molding to sintering in a short time period of several hours at the dental office is a difficult task. Indeed, it takes several days from a patient visiting the clinic to have the shape of prosthesis determined to the dentist actually treating the patient with the finished prosthesis. In such a work flow, the patient cannot be treated on the day of the visit, and needs to revisit the clinic several days later.

A pre-sintered body of zirconia typically shrinks about 20% when fully sintered into a zirconia sintered body. Though molding of a pre-sintered body takes into account this information, the finished sintered body does not always accurately match the shape intended for the prosthesis.

For faster and more accurate fabrication of a prosthesis, it would accordingly be desirable to make a prosthesis by directly shaping a zirconia sintered body, instead of processing from a pre-sintered body of zirconia. In fact, a machinable preform for dental restorations has been developed as such a zirconia sintered body, as disclosed in, for example, Patent Literature 1. It is also desired to reduce the amount of excess material removed from the sintered body, in order to reduce the work time and the burden on patients, and improve the durability of a working tool.

CITATION LIST

Patent Literature

Patent Literature 1: JP 2017-077454 A

SUMMARY OF INVENTION

Technical Problem

Patent Literature 1 discloses milling a monolayer zirconia sintered body to provide a machinable preform body for dental restorations. The preform body has a stem, at most 4 mm wide, joining the main body of the preform to an attaching member. A problem, however, is that the preform body requires a long work time, and has poor aesthetics because of the monolayer structure.

In order to reduce the amount of work time, the preform body needs to be press molded into a predetermined shape in advance. For improved aesthetics, it is desirable to use not a monolayer preformed body such as that disclosed in Patent Literature 1 but a layered preform body that can reproduce the appearance of natural teeth. However, press molding to produce such a layered preform body fails to properly fill a zirconia powder in the required density when the mold has narrow portions.

Another way to reduce the amount of work time and improve aesthetics is to fabricate a layered pre-sintered body of zirconia, and sinter the pre-sintered body after converting it into a preform body. However, because of the shape of the stem, the preform body easily deforms during firing.

It is accordingly an object of the present invention to provide a zirconia sintered body that undergoes little deformation during firing while requiring a shorter work time, and that provides enhanced aesthetics.

Solution to Problem

The present inventors conducted intensive studies to find a solution to the foregoing problems, and found that the problems can be solved with a zirconia sintered body of a specific shape. The present inventors completed the present invention after further studies based on this finding.

Specifically, the present invention relates to the following.
[1] A columnar zirconia sintered body having a base and a side face, the base comprising a surface shape that is neither square nor rectangular but has at least one straight portion.
[2] The zirconia sintered body according to [1], wherein the zirconia sintered body has a layered structure comprising two or more layers laminated in a direction perpendicular to the base.
[3] The zirconia sintered body according to [1] or [2], wherein the base has a depression.
[4] The zirconia sintered body according to [3], wherein the depression has a depth that is at most 45% of a column height, and a maximum length of 12 mm or less at the base.

[5] The zirconia sintered body according to any one of [1] to [4], wherein the surface shape of the base is a combination of at least one curve portion and at least one straight portion.
[6] The zirconia sintered body according to [5], wherein the curve portion is at least one selected from the group consisting of an arc, an ellipsoidal arc, a parabola, and a catenary.
[7] The zirconia sintered body according to any one of [1] to [6], wherein the surface shape comprises at least one recessed portion.
[8] The zirconia sintered body according to [7], wherein the surface shape comprises at least two recessed portions, and the zirconia sintered body has receding portions and a narrow portion defined between two of the receding portions, the receding portions having a shape defined by the recessed portions extending perpendicularly to the base.
[9] The zirconia sintered body according to [8], wherein the zirconia sintered body comprises a main body portion in contact with the narrow portion, and a stem portion including the narrow portion and having a smaller area than the main body portion at the base.
[10] The zirconia sintered body according to [9], wherein the stem portion is as high as the main body portion in height.
[11] The zirconia sintered body according to [9] or [10], wherein the main body portion has a maximum width of 20 mm or more, and the stem portion has a minimum width of more than 4 mm.
[12] The zirconia sintered body according to any one of [1] to [11], comprising zirconia, and a stabilizer capable of inhibiting a phase transformation of zirconia,
the zirconia sintered body satisfying the following conditions:
L1 is 68.0 or more and 90.0 or less,
a1 is −3.0 or more and 4.5 or less,
b1 is 0.0 or more and 24.0 or less,
L2 is 60.0 or more and 85.0 or less,
a2 is −2.0 or more and 7.0 or less,
b2 is 4.0 or more and 28.0 or less,
L1>L2,
a1<a2,
b1<b2,
where (L1,a1,b1) represent values of (L*,a*,b*) of the L*a*b* color system as measured at a first point falling within an interval of a length from one end of the zirconia sintered body to 25% of the entire length of a straight line extending along a first direction from one end to the other end of the zirconia sintered body, and (L2,a2,b2) represent values of (L*,a*,b*) of the L*a*b* color system as measured at a second point falling within an interval of a length from the other end of the zirconia sintered body to 25% of the entire length of the straight line, and
the values of (L*,a*,b*) of the L*a*b* color system show unchanging patterns of increase and decrease in a direction from the first point to the second point.
[13] The zirconia sintered body according to [12], wherein L1-L2 is more than 0 and 12.0 or less, a2−a1 is more than 0 and 6.0 or less, and b2−b1 is more than 0 and 12.0 or less.
[14] The zirconia sintered body according to [12] or [13], wherein the zirconia sintered body on a straight line connecting the first point and the second point comprises no interval in which the L* value increases by 1 or more in a direction from the first point to the second point, no interval in which the a* value decreases by 1 or more in a direction from the first point to the second point, and no interval in which the b* value decreases by 1 or more in a direction from the first point to the second point.

[15] A dental restoration comprising a zirconia sintered body of any one of [1] to [14].
[16] The dental restoration according to [15], comprising the zirconia sintered body with an attachment to be attached to a processing apparatus.
[17] A zirconia pre-sintered body that becomes a zirconia sintered body of any one of [1] to [14] upon firing.

Advantageous Effects of Invention

A zirconia sintered body of the present invention and a dental restoration made therefrom have a specific shape, providing a reduction of work time by reducing the amount of material that needs to be milled, and enhancing aesthetics while reducing deformation that occurs during firing. In a traditional work flow involving molding of a zirconia pre-sintered body, the process requires a high-temperature firing process and apparatus before installation of a prosthetic zirconia sintered body in a patient, and it has been difficult to complete treatment in one office visit. A zirconia sintered body of the present invention and a dental restoration made therefrom do not require such a firing process, and can reduce the time burden on a patient such as in attending the clinic. A zirconia sintered body of the present invention is also easily workable, and can improve the durability of a working tool.

When structured to include two or more layers laminated in a direction perpendicular to the base, a zirconia sintered body of the present invention can provide a patient with a dental restoration having a shade and translucency close to the appearance of natural teeth.

A zirconia sintered body of the present invention may be such that the base has surface shapes with two recessed portions, and the zirconia sintered body may have receding portions and a narrow portion defined between two of the receding portions, where the receding portions have a shape defined by the recessed portions extending perpendicularly to the base, and the zirconia sintered body may include a main body portion in contact with the narrow portion, and a stem portion including the narrow portion and having a smaller area than the main body portion at the base. By providing the stem portion as a columnar portion having the same height as the main body portion, and by providing a suitable width for the stem portion, deformation that occurs during firing can be prevented to provide a precision prosthesis.

DESCRIPTION OF EMBODIMENTS

A zirconia sintered body of the present invention is a columnar zirconia sintered body having a base and a side face. Importantly, the base has a surface shape that is neither square nor rectangular but has at least one straight portion. As used herein, the term "columnar" includes a cylinder-like spatial figure having two congruent plane figures as bases, including a cylinder-like spatial figure having bases with congruent surface shapes as viewed from the top or bottom, and in which at least one of the bases has a depression or a raised portion. In this specification, "zirconia sintered body" and "zirconia pre-sintered body" refer to objects comprising zirconia as a main component, and may comprise a stabilizer capable of inhibiting a phase transformation of zirconia, as will be described later.

Figure 1A:
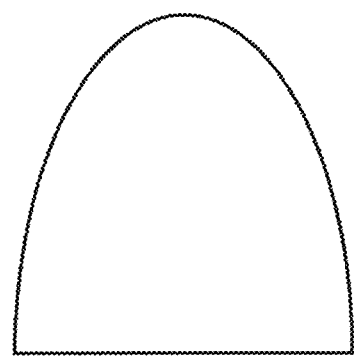
FIG. 1A is a schematic diagram representing an example of a base of a zirconia sintered body according to the present invention.
Figure 1B:
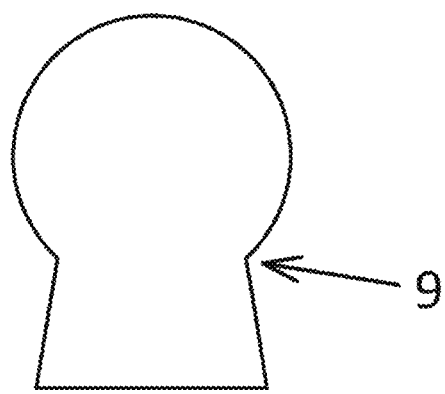
FIG. 1B is a schematic diagram representing an example of a base of a zirconia sintered body according to the present invention.
Figure 1C:
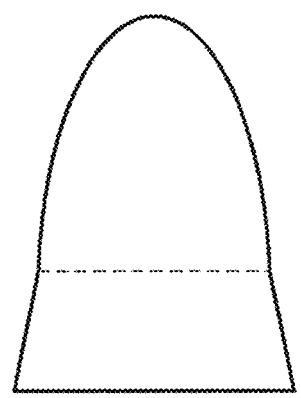
FIG. 1C is a schematic diagram representing an example of a base of a zirconia sintered body according to the present invention.
Figure 1D:
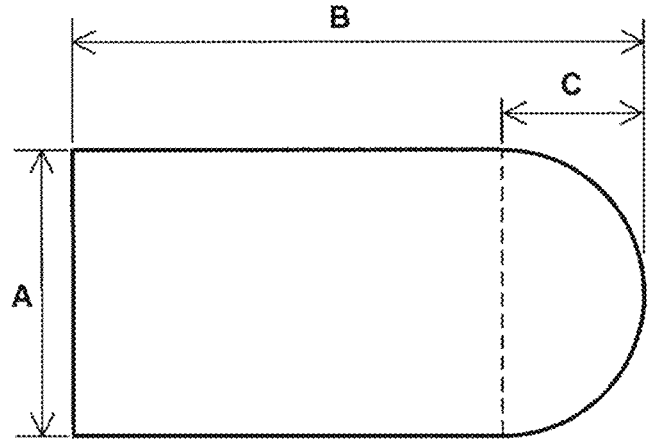
FIG. 1D is a schematic diagram representing an example of a base of a zirconia sintered body according to the present invention.

A zirconia sintered body of the present invention has a base with a surface shape that is neither square nor rectangular but has at least one straight portion. Examples of such shapes include a shape combining a straight portion with a polygon (for example, a triangle, a parallelogram, a trapezoid, a pentagon, or a star shape) or a part of such a polygon, or with a curve portion such as a semicircle, a semiellipsoid, a parabola, or a catenary. Other examples include a figure combining these shapes (for example, a shape combining a straight portion of a polygon such as a quadrangle (for example, a square, a rectangle, a trapezoid, or a parallelogram), a pentagon, or a star shape with a curve portion of a shape such as a semicircle, a semiellipsoid, a parabola, or a catenary), for example, such as those shown in FIG. 1A to FIG. 1D. Preferably, the base has a surface shape combining at least one curve portion and at least one straight portion, more preferably a surface shape combining at least one straight portion with at least one curve portion selected from the group consisting of an arc, an ellipsoidal arc, a parabola, and a catenary. A certain preferred embodiment is a zirconia sintered body in which the base has a surface shape including at least one recessed portion 9. FIG. 1B shows an example of a zirconia sintered body in which the base has a surface shape including two recessed portions 9. Another certain preferred embodiment is a columnar zirconia sintered body having side faces with at least one receding portion of a shape defined by the recessed portion 9 extending perpendicularly to the base. Yet another certain embodiment is a columnar zirconia sintered body in which the base has a surface shape including two recessed portions 9, and in which the zirconia sintered body has receding portions and a narrow portion defined between two of the receding portions, where the receding portions are side-surface portions of a shape defined by the recessed portions 9 extending perpendicularly to the base, as described below. Still another certain preferred embodiment is a zirconia sintered body having a base with a surface shape combining a curve portion (for example, a semicircle, a semiellipsoid, a parabola, or a catenary) and a polygon such as a quadrangle (for example, a square, a rectangle, a trapezoid, or a parallelogram). As an example, FIG. 1C shows a zirconia sintered body having a base with a surface shape combining a trapezoid with an ellipsoid or a parabola, and FIG. 1D shows a zirconia sintered body having a base with a surface shape combining a rectangle and a semicircle. It is to be noted here that FIG. 1D represents an example of the size used in Example 3, and the size is not limited to this. With the base including a curve portion of a shape extending perpendicularly to the base (along the height), the zirconia sintered body, owning to its shape, can have a smaller volume than an ordinary zirconia sintered body of a quadrangular prism shape by an amount corresponding this shape. In the present specification, a side-surface portion formed by the curve portion also can be said as a receding portion. Taking the zirconia sintered body of FIG. 1D as an example, a side-surface portion of a shape formed by the curve portion, C (a portion defined by the semicircle and the dotted line, which may be, e.g., 10 mm), extending along the height, B (which may be, e.g., 40 mm), from the bottom, A (which may be, e.g., 20 mm), also can be said as a receding portion. By having these shapes, a zirconia sintered body of the present invention has less excess material to be removed when milled to make a prosthesis. The straight portion (at least one straight portion) of the base can be used as a bonding site for an attachment to be attached to a processing apparatus, as will be described later.

Figure 2:
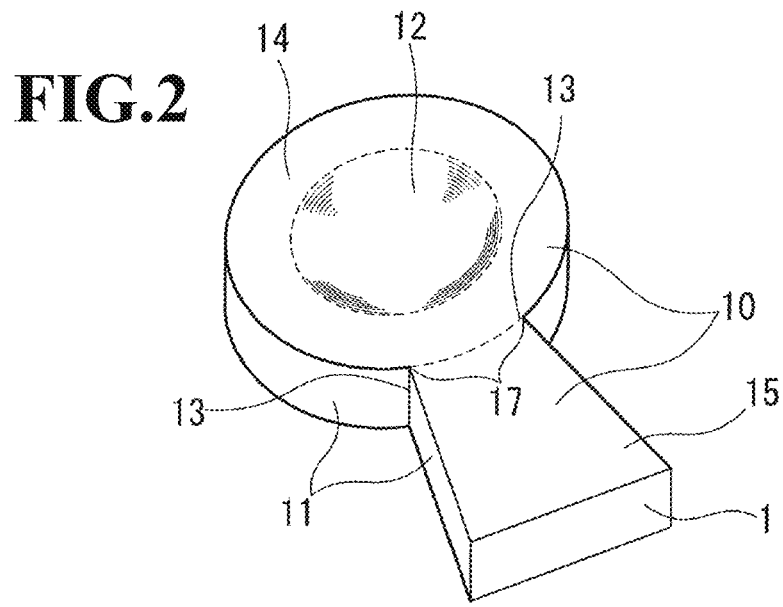
FIG. 2 is a schematic diagram representing an example of a zirconia sintered body according to the present invention.
Figure 3A:
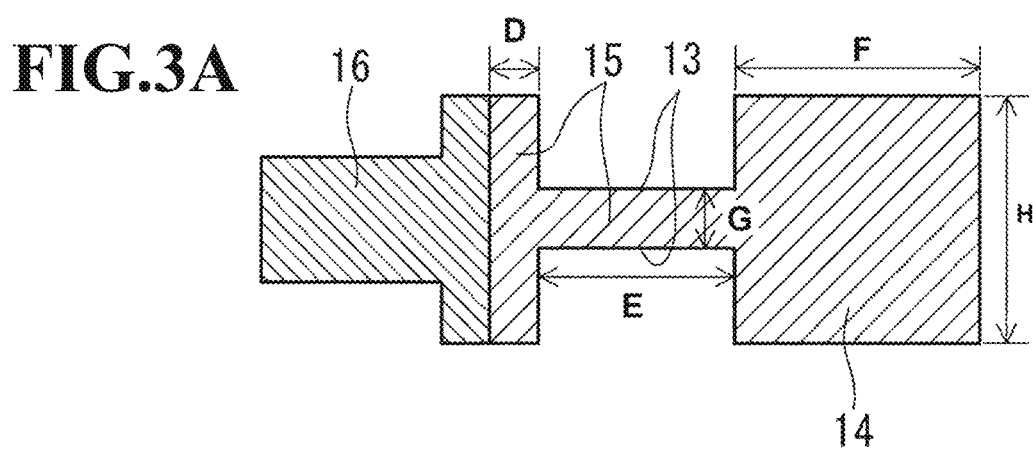
FIG. 3A is a schematic diagram showing a zirconia sintered body (bottom view) fabricated in Example 1.
Figure 3B:
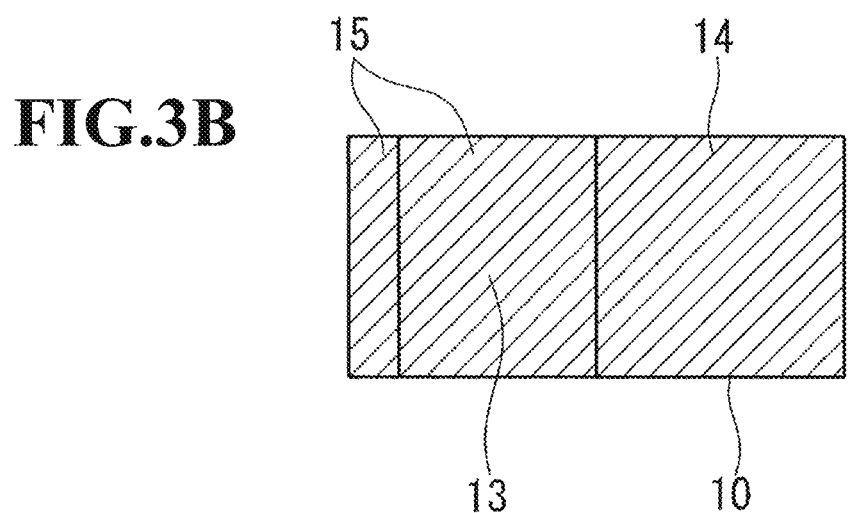
FIG. 3B is a schematic diagram showing a zirconia sintered body (side view) fabricated in Example 1.
Figure 4A:
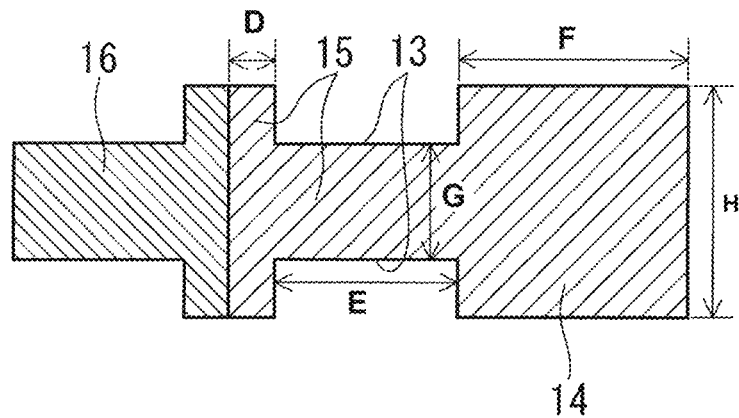
FIG. 4A is a schematic diagram showing a zirconia sintered body (bottom view) fabricated in Example 2.
Figure 4B:
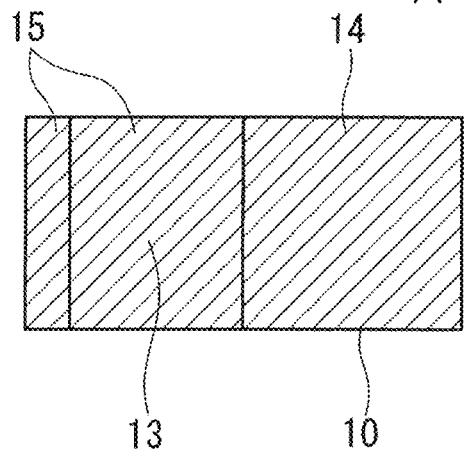
FIG. 4B is a schematic diagram showing a zirconia sintered body (side view) fabricated in Example 2.

In other certain embodiments, a zirconia sintered body 1 of the present invention preferably has a depression 12 at the base, as shown in FIG. 2. This provides a reduction of the amount of excess material that is removed when milling the zirconia sintered body 1 of the present invention to make a prosthesis. The depression 12 preferably has a circular or near circular (including elliptic) outline. Preferably, the depression 12 has such a shape that a cross section taken perpendicular to the base 10 of the zirconia sintered body is composed of a straight line and a curve such as an arc, an ellipsoidal arc, a parabola, or a catenary. The depression 12 may be shaped as a part of a sphere or oval sphere. Preferably, the depression 12 is sized to have a depth that is at most 45% of the height of zirconia sintered body 1 (columnar), and a maximum length of preferably 12 mm or less at the base 10 (a diameter or longest diameter when the depression is circular or near circular in shape). The depth is more preferably at most 40%, and the diameter or longest diameter is more preferably 12 mm or less. Preferably, the depression 12 is sized to have a depth of at least 25%, and a diameter or longest diameter of 10 mm or more, more preferably a depth of at least 30%, and a diameter or longest diameter of 10 mm or more. Here, the depth of depression 12 is a measured length at the deepest portion, and represents a proportion relative to the height of a zirconia sintered body of the present invention (columnar). A zirconia sintered body of the present invention may have a base with a raised portion, as long as the present invention can produce its effects.

A certain embodiment of a zirconia sintered body of the present invention is described below, with reference to FIG. 2. Preferably, a zirconia sintered body 1 of the present invention is columnar in shape, and has side faces 11 with at least one receding portion 13 of a shape defined by a recessed portion extending perpendicularly to the base 10. As shown in FIG. 2, the zirconia sintered body 1 of the present invention is preferably shaped to include two receding portions 13, and a narrow portion 17 defined between the two receding portions 13. The receding portions 13 are narrower in width than a main body portion 14 as viewed from the bottom. More preferably, the zirconia sintered body 1 of the present invention is shaped to include a main body portion 14 in contact with the narrow portion 17 (the dotted line portion in FIG. 2), and a stem portion 15 including the narrow portion 17 and having a smaller area than the main body portion 14 at the base. In other words, the zirconia sintered body 1 of the present invention is more preferably a columnar object that is separated into two regions—main body portion 14 and stem portion 15—by surfaces including the two receding portions 13. In a configuration in which the zirconia sintered body 1 is separated into two regions as above, the portion with at least one straight portion represents the stem portion 15 (see FIG. 2). By having these shapes, the zirconia sintered body 1 of the present invention can have less excess material to be removed when milled to make a prosthesis. Because the stem portion 15 of the zirconia sintered body 1 of the present invention is columnar in shape having the same height, H, as the main body portion 14, and has a suitable width as shown in FIGS. 3A and 3B and FIGS. 4A and 4B, deformation that occurs during firing can be prevented to provide a precision prosthesis. The width, H, of main body portion 14, and the width, G, of stem portion 15 (specifically, the width of the portion between two surfaces including receding portions 13, with a length dimension, E, in FIG. 3A and FIG. 4A) are such that the main body portion 14 (with a length dimension, F) has a maximum width of preferably 20 mm or more, and the stem portion 15 (with a length dimension, D) has a minimum width of more than 4 mm. More preferably, the main body portion 14 has a maximum width of 20 mm or more, and the stem portion 15 has a minimum width of more than 6 mm. The main body portion 14 has a maximum width of preferably 30 mm or less, and the stem portion 15 has a minimum width of preferably 10 mm or less. More preferably, the main body portion 14 has a maximum width of 30 mm or less, and the stem portion 15 has a minimum width of 8 mm or less. The straight portion (at least one straight portion) of the base 10 is used as a bonding site for an attachment to be attached to a processing apparatus. The zirconia sintered body 1 of the present invention has a maximum amount of deformation of preferably 0.03 mm, more preferably 0.01 mm during firing. The embodiments represented by FIGS. 3A and 3B, and FIGS. 4A and 4B may also have a depression, as in FIG. 2. As, examples of dimensions, D may be 4 mm, E may be 16 mm, F may be 20 mm, G may be 3.6, 4.8, or 10 mm, and H may be 20 mm.

Another embodiment of the present invention is a dental restoration comprising a zirconia sintered body. A dental restoration of the present invention encompasses not only a mill blank (e.g., a block) before milling into a shape of a specific dental product such as a prosthesis, but a dental product after milling. By using the zirconia sintered body as a dental restoration to be milled, the dental restoration can have less material to be milled, providing a reduction of the amount of excess material that is removed by milling when making a dental product. This makes it possible to reduce the amount of work time, and puts less physical burden on patients. In a conventional work flow, a patient is practically untreatable in one office visit for placement of a prosthesis using a zirconia sintered body. However, a dental restoration of the present invention does not require a firing process, and can reduce the time burden on a patient such as in attending the clinic. When provided as a mill blank to be milled, a dental restoration of the present invention preferably comprises the zirconia sintered body with an attachment to be attached to a processing apparatus. Preferably, the attachment is bonded to the zirconia sintered body. A method of production of a dental product as a dental restoration of the present invention after milling is not particularly limited, and a dental product can be produced from a zirconia sintered body of the present invention using a known device and a known method.

The present invention encompasses a pre-sintered body of zirconia that becomes a zirconia sintered body of the present invention upon firing. The firing conditions for making a zirconia sintered body from a zirconia pre-sintered body include a firing temperature of preferably 1,100 to 1,650° C., more preferably 1,300 to 1,650° C., even more preferably 1,350 to 1,600° C. The firing time is preferably 30 to 720 minutes, more preferably 30 to 120 minutes, even more preferably 30 to 60 minutes. An example method of producing a zirconia sintered body from a zirconia pre-sintered body of the present invention will be described later in detail.

A zirconia sintered body of the present invention is a sintered body of primarily crystal grains of partially stabilized zirconia, and preferably comprises partially stabilized zirconia as a matrix phase. In a zirconia sintered body of the present invention, the main crystalline phase of zirconia is preferably tetragonal. Preferably, the zirconia sintered body is essentially free of a monoclinic system. The crystalline phase in the zirconia sintered body increases the mechanical strength.

A zirconia sintered body of the present invention encompasses not only a sintered body obtained by sintering molded zirconia particles under ordinary pressure or no applied pressure, but a sintered body obtained by compacting molded zirconia particles by a high-temperature process under applied pressure, such as HIP (Hot Isostatic Pressing).

Preferably, a zirconia sintered body of the present invention comprises zirconia, and a zirconia stabilizer. The stabilizer inhibits a phase transformation of tetragonal zirconia into a monoclinic system. Strength, durability, and dimensional accuracy can improve by inhibiting phase transformation. The stabilizer is preferably one capable of forming partially stabilized zirconia. Examples of such stabilizers include oxides such as calcium oxide (CaO), magnesium oxide (MgO), yttrium oxide ($Y_2O_3$; hereinafter referred to as "yttria"), cerium oxide ($CeO_2$), scandium oxide ($Sc_2O_3$), niobium oxide ($Nb_2O_5$), lanthanum oxide ($La_2O_3$), erbium oxide ($Er_2O_3$), praseodymium oxide ($Pr_6O_3$), samarium oxide ($Sm_2O$), europium oxide ($Eu_2O_3$), and thulium oxide ($Tm_2O_3$). These may be used alone, or two or more thereof may be used in combination. Preferably, the stabilizer is added in an amount that enables tetragonal zirconia particles to partially stabilize. The stabilizer is preferably yttria in view of strength and translucency of the zirconia sintered body. The yttria content is preferably 3 mol % or more, more preferably 3.5 mol % or more, even more preferably 4 mol % or more relative to the total number of moles of zirconia and yttria. The translucency of the zirconia sintered body can increase with a yttria content of 3 mol % or more. The yttria content is preferably 7.5 mol % or less, more preferably 7 mol % or less, even more preferably 6.5 mol % or less, particularly preferably 6 mol % or less relative to the total number of moles of zirconia and yttria. A decrease of the strength of the zirconia sintered body can be reduced with a yttria content of 7.5 mol % or less. Tetragonal zirconia that has partially stabilized after addition of a stabilizer is called partially stabilized zirconia (PSZ).

A zirconia sintered body of the present invention may comprise an additive or additives other than zirconia and the stabilizer, provided that the present invention can exhibit its effects. Examples of such additives include pigments (including colorants, complex pigments, and fluorescent agents), alumina ($Al_2O_3$), titanium oxide (TiO), and silica ($SiO_2$). These may be used alone, or two or more thereof may be used in combination. Preferably, a zirconia sintered body of the present invention comprises alumina. Preferably, the alumina is a alumina. A zirconia sintered body of the present invention can have increased strength by containing alumina. Preferably, a zirconia sintered body of the present invention comprises titanium oxide. By containing titanium oxide, a zirconia sintered body of the present invention can promote grain growth of zirconia. In view of preventing decrease of transparency of zirconia sintered body, a zirconia sintered body of the present invention is preferably essentially free of silica. Here, "essentially free" means that the content falls in a range that has no particular impact on characteristics of the present invention, and the term is used with the intention that the content, preferably, does not exceed the levels of impurities. As such, the term does not necessarily mean that the content is below detection limits.

Examples of colorants among the pigments include an oxide of at least one element selected from the group consisting of Ti, V, Cr, Mn, Fe, Co, Ni, Zn, Y, Zr, Sn, Sb, Bi, Ce, Pr, Sm, Eu, Gd, Tb, and Er. Examples of the complex pigments include $(Zr,V)O_2$, $Fe(Fe,Cr)_2O_4$, $(Ni,Co,Fe)(Fe,Cr)_2O_4$—$ZrSiO_4$, and $(Co,Zn)Al_2O_4$. Examples of the fluorescent agents include $Y_2SiO_5$:Ce, $Y_2SiO_5$:Tb, $(Y,Gd,Eu)BO_3$, $Y_2O_3$:Eu, YAG:Ce, $ZnGa_2O_4$:Zn, and $BaMgAl_{10}O_{17}$:Eu.

Preferably, a zirconia sintered body of the present invention has a layered structure comprising two or more layers laminated in a direction along a straight line extending perpendicularly to the base, from one end to the other end of a side face. In this way, a prosthesis can be obtained that has a shade and translucency close to the appearance of natural teeth. The layered structure has preferably two or more layers, more preferably four or more layers. The number of layers does not particularly have an upper limit, as long as the present invention can exhibits its effects. For example, the number of layers may be at most 8.

In view of reproducing the shade suited for dental use, it is preferable in a zirconia sintered body of the present invention, when having a layered structure comprising two or more layers, that:

L1 be 68.0 or more and 90.0 or less,
a1 be −3.0 or more and 4.5 or less,
b1 be 0.0 or more and 24.0 or less,
L2 be 60.0 or more and 85.0 or less,
a2 be −2.0 or more and 7.0 or less,
b2 be 4.0 or more and 28.0 or less,
L1>L2,
a1<a2, and
b1<b2, where (L1,a1,b1) represent values of (L*,a*,b*) of the L*a*b* color system as measured at a first point falling within an interval of a length from one end of the zirconia sintered body to 25% of the entire length of a straight line extending along a first direction from one end to the other end of the zirconia sintered body, and (L2,a2,b2) represent values of (L*,a*,b*) of the L*a*b* color system as measured at a second point falling within an interval of a length from the other end of the zirconia sintered body to 25% of the entire length of the straight line, and that:
the values of (L*,a*,b*) of the L*a*b* color system show unchanging patterns of increase and decrease in a direction from the first point to the second point.

More preferably, L1 is 69.0 or more and 89.0 or less, a1 is −2.7 or more and 4.0 or less, b1 is 1.0 or more and 23.5 or less, L2 is 61.5 or more and 84.5 or less, a2 is −1.5 or more and 6.5 or less, and b2 is 5.5 or more and 26.0 or less.

More preferably, L1 is 70.0 or more and 87.0 or less, a1 is −2.5 or more and 3.7 or less, b1 is 2.0 or more and 23.0 or less, L2 is 63.0 or more and 84.0 or less, a2 is −1.2 or more and 6.0 or less, and b2 is 7.0 or more and 24.0 or less.

By satisfying these ranges, the zirconia sintered body can match its color with the average shade of a natural tooth.

Preferably, in a zirconia pre-sintered body as a precursor before firing into a zirconia sintered body of the present invention, L1-L2 is more than 0 and 12.0 or less, a2−a1 is more than 0 and 6.0 or less, and b2−b1 is more than 0 and 12.0 or less.

More preferably, L1-L2 is more than 0 and 10.0 or less, a2−a1 is more than 0 and 5.5 or less, and b2−b1 is more than 0 and 11.0 or less.

Even more preferably, L1-L2 is more than 0 and 8.0 or less, a2−a1 is more than 0 and 5.0 or less, and b2−b1 is more than 0 and 10.0 or less.

By satisfying these ranges, the zirconia sintered body can more desirably reproduce the shade of a natural tooth.

Figure 6:
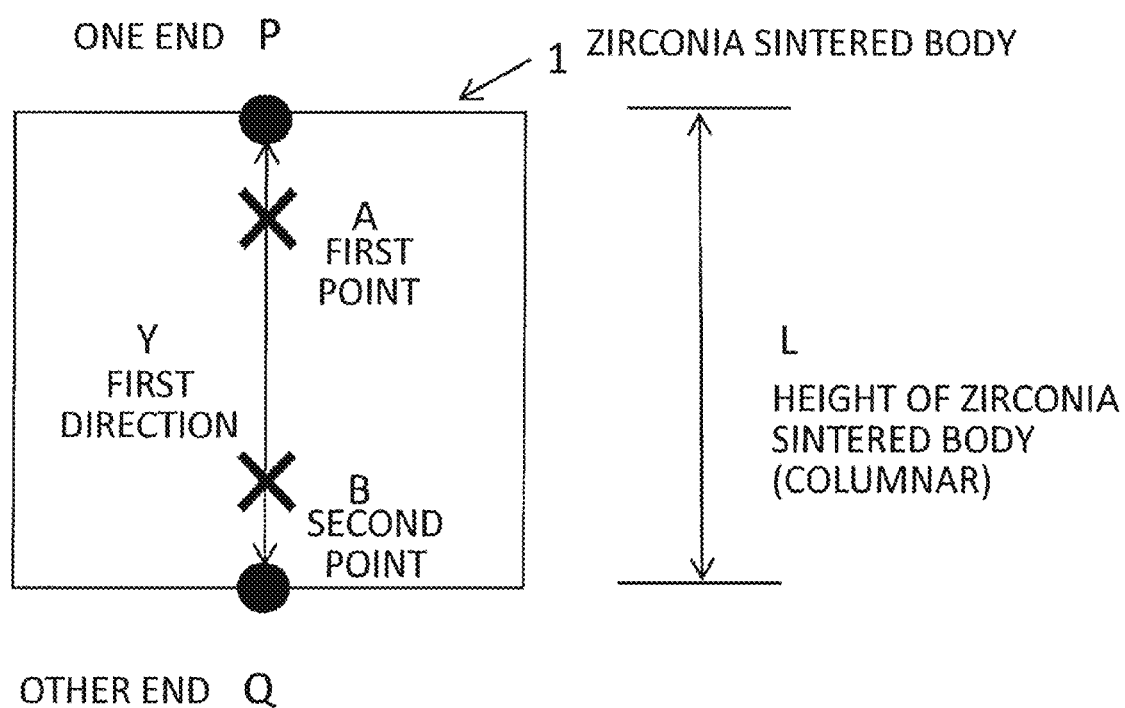
FIG. 6 is a schematic diagram representing a zirconia sintered body according to the present invention.

Preferably, a zirconia sintered body of the present invention shows a color change from one end to the other end of the zirconia sintered body. Specifically, on a straight line connecting the first point and the second point, it is preferable that there exist no interval in which the L* value increases by 1 or more from the first point to the second point, no interval in which the a* value decreases by 1 or more from the first point to the second point, and no interval in which the b* value decreases by 1 or more from the first point to the second point. This is described below with reference to FIG. 6, which is a schematic view representing a side face of a columnar zirconia sintered body of the present invention. FIG. 6 shows a zirconia sintered body 1 with a straight line extending along a first direction Y from one end P to the other end Q. Preferably, the pattern of increase or decrease of L*, a*, and b* values does not change in the opposite direction. Specifically, when the L* value is in a pattern of decrease on a straight line from one end P to the other end Q, it is preferable that there exist no interval in which the L* value essentially increases. For example, referring to FIG. 6 showing a first point A and a second point B on a straight line connecting one end P to the other end Q, it is preferable that there exist no interval in which the L* value increases by 1 or more, more preferably 0.5 or more when the L* value is in a pattern of decrease from first point A to second point B on a straight line connecting first point A and second point B. When the a* value is in a pattern of increase on a straight line from one end P to the other end Q, it is preferable that there exist no interval in which the a* value essentially decreases. For example, when the a* value is in a pattern of increase from first point A to second point B on a straight line connecting first point A and second point B, it is preferable that there exist no interval in which the a* value decreases by 1 or more, more preferably 0.5 or more. When the b* value is in a pattern of increase on a straight line from one end P to the other end Q, it is preferable that there exist no interval in which the b* value essentially decreases. For example, when the b* value is in a pattern of increase from first point A to second point B on a straight line connecting first point A and second point B, it is preferable that there exist no interval in which the b* value decreases by 1 or more, more preferably 0.5 or more.

Concerning the direction of color change of zirconia sintered body 1, it is preferable that the a* and b* values show a pattern of increase from one end P to the other end Q when the L* value is in a pattern of decrease in this direction. For example, the color changes from white to pale yellow, pale orange, or pale brown from one end P to the other end Q.

In the present invention, "first direction from one end to the other end" means a direction in which the color changes. For example, "first direction" is preferably the direction of powder lamination in the method of production described below.

An example of a method for producing a zirconia sintered body of the present invention is described below.

First, zirconia and a stabilizer are pulverized and mixed wet in water to form a slurry. After drying the slurry to granulate, the granulated material is calcined to produce a primary powder.

The primary powder is divided into portions that correspond in number to the layers to be provided. For example, when making a composition or pre-sintered body having a total of 4 layers, the primary powder is divided into 4 portions to prepare first to fourth powders. A pigment is added to each powder. The pigment is added in an amount that is appropriately adjusted to develop the color needed for each layer. The zirconia powder of each color is then mixed in water until the desired particle diameter is achieved. The resulting zirconia slurry is dried to granulate into a secondary powder corresponding to each layer. When using additives such as alumina, titanium oxide, and a binder, additives may be added when preparing the primary powder, or when preparing the secondary powder.

The next step is to layer the powders one after another. Layering of an upper layer is preceded by leveling the top surface of a lower layer without pressing. For example, the powder of the lower layer is leveled off to provide a flat top surface. For preparation of a four-layer composition or pre-sintered body, for example, a first powder is charged into a mold to a predetermined thickness (for example, 25 to 45% of the total thickness). Here, the top surface of the first powder is leveled without pressing. A second powder is then charged onto the first powder to a predetermined thickness (for example, 5 to 25% of the total thickness). The top surface of the second layer is leveled without pressing. Thereafter, a third powder is charged onto the second powder to a predetermined thickness (for example, 5 to 25% of the total thickness). The top surface of the third layer is leveled without pressing. A fourth powder is then charged onto the third powder to a predetermined thickness (for example, 25 to 45% of the total thickness). The top surface of the fourth layer is leveled without pressing. Preferably, the first to fourth layers are layered in an increasing or decreasing order of pigment content.

Because the previously charged layers are not pressed before charging the next layer, the adjacent layers can have improved adhesion, and the sintered body can have increased strength. The adjacent layers can also have a more subtle color difference. In this way, the sintered body can have a gradation with a natural transition of color from one layer to the next.

The foregoing method does not require an intermediate layer between the main layers. That is, the method requires only four layers when four main layers are provided. The method also does not require pressing each layer. This makes it possible to greatly reduce labor and time, and improve productivity.

After laminating all layers, the layers are pressed into a molded product.

A zirconia sintered body of the present invention can be fabricated by firing a zirconia pre-sintered body at a temperature (sinterable temperature) that sinters zirconia particles (firing step). The firing temperature in the firing step is, for example, preferably 1,300° C. or more, more preferably 1,350° C. or more. The firing temperature is, for example, preferably 1,650° C. or less, more preferably 1,600° C. or less. The rate of temperature increase and the rate of temperature decrease are preferably 300° C./min or less.

In the firing step, the retention time at the sinterable temperature (for example, the maximum firing temperature) is preferably less than 120 minutes, more preferably 90 minutes or less, even more preferably 75 minutes or less, yet more preferably 60 minutes or less, particularly preferably 45 minutes or less, most preferably 30 minutes or less. The retention time may be 25 minutes or less, 20 minutes or less, or 15 minutes or less. The retention time is preferably 1 minute or more, more preferably 5 minutes or more, even more preferably 10 minutes or more. A zirconia pre-sintered body of the present invention, even with such a short firing time, can suppress a decrease of translucency in the zirconia sintered body fabricated. With a reduced firing time, it is also possible to increase production efficiency, and reduce the cost of energy.

Preferably, the rate of temperature increase and the rate of temperature decrease in the firing step are set to reduce the time required for the firing step. For example, the rate of temperature increase may be set so that the temperature reaches the maximum firing temperature as short a time period as the performance of the firing furnace allows. The rate of temperature increase to the maximum firing temperature may be, for example, 10° C./min or more, 50° C./min or more, 100° C./min or more, 120° C./min or more, 150° C./min or more, or 200° C./min or more. The rate of temperature decrease is preferably set at a rate that does not cause defects in the sintered body, for example, such as cracking. For example, the sintered body may be allowed to cool at room temperature after heating. Here, "maximum firing temperature" means the highest temperature reached in the firing step.

The embodiment described above is based on an example in which the pre-sintered body and sintered body have a four-layer construction. However, the laminate is not limited to four layers. For example, the present invention may be a composition, a pre-sintered body, or a sintered body having a two-layer construction fabricated from the first and fourth layers, or may be a pre-sintered body or sintered body having a three-layer construction fabricated from the first, second, and fourth layers, or the first, third, and fourth layers.

A zirconia sintered body of the present invention may be a columnar object having a main body portion and a stem portion, as described above. Preferably, a zirconia sintered body of the present invention has an attachment on the stem portion. The zirconia sintered body, when provided with an attachment, can be fixed to a processing apparatus. The way the attachment is attached to a zirconia sintered body of the present invention is not particularly limited. For example, the attachment may be bonded to the zirconia sintered body using an adhesive or the like.

A zirconia sintered body of the present invention has dental use, and can be suitably used for, for example, fabrication of prostheses, such as copings, frameworks, crowns, abutments, inlays, onlays, and laminate veneers, by milling using a dental CAD/CAM system. A method for the production of a prosthesis from a zirconia sintered body of the present invention is not particularly limited, and a known method may be used as appropriate. It is, however, preferable that the method comprise milling of the zirconia sintered body.

The present invention encompasses combinations of the foregoing features, provided that such combinations made in various forms within the technical idea of the present invention can produce the effects of the present invention.

EXAMPLES

The following describes the present invention in greater detail by way of Examples. It should be noted that the present invention is in no way limited by the following Examples, and various changes may be made by a person with ordinary skill in the art within the technical idea of the present invention.

Examples 1 and 2 and Comparative Example 1

In Examples and Comparative Example, zirconia pre-sintered bodies and sintered bodies were fabricated using the following procedures.

The raw material powder was prepared as follows. First, a mixture was prepared using a monoclinic zirconia powder and a yttria powder (the mixture contained 4 mol % yttria). The mixture was added to water to prepare a slurry, and pulverized and mixed wet with a ball mill until an average particle diameter of 0.13 μm or less was achieved. After pulverization, the slurry was dried with a spray dryer, and the resulting powder was fired at 1,000° C. for 2 hours to prepare a powder (primary powder). For fabrication, the raw material is passed in a spray drying device, and the powder is processed until it conforms to the contents of the present specification.

The primary powder was divided into four portions, first to fourth powders. Pigments were added to each powder in amounts that translate into the contents shown in Table 1 (the contents are the same for Examples and Comparative Example). After adding pigments, the powder was added to water to prepare a slurry, and pulverized and mixed wet with a ball mill until an average particle diameter of 0.13 m was achieved. After pulverization, a binder was added to the slurry, and the slurry was dried with a spray dryer to prepare first to fourth powders (secondary powders).

Thereafter, the first powder (secondary powder) was charged into a die, and the top surface of the first powder was leveled to provide a flat surface. On the first powder was charged the second powder, and the top surface of the second powder was leveled to provide a flat surface. In a similar fashion, the third powder was charged onto the second powder, and the top surface of the third powder was leveled to provide a flat surface. On the third powder was charged the fourth powder, and the top surface of the fourth powder was leveled. Finally, with the upper die set on the powders, the powders were subjected to primary pressing at a surface pressure of 300 kg/cm² for 90 seconds, using a uniaxial pressing machine. The resulting primary press-molded body was then formed into a compact of a four-layer structure by CIP at 1,700 kg/cm² for 5 minutes.

Figure 5A:
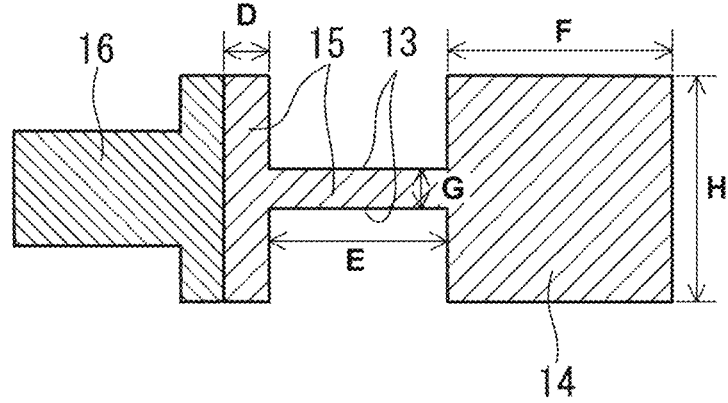
FIG. 5A is a schematic diagram showing a zirconia sintered body (bottom view) fabricated in Comparative Example 1.
Figure 5B:
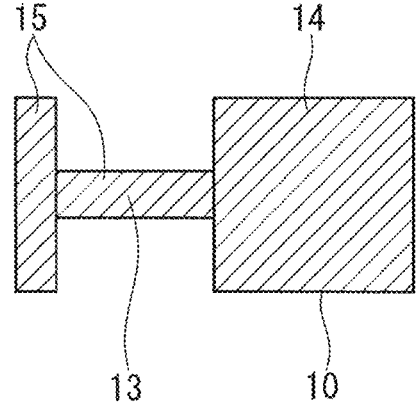
FIG. 5B is a schematic diagram showing a zirconia sintered body (side view) fabricated in Comparative Example 1.

The compact was fired at 1,000° C. for 2 hours to prepare a zirconia pre-sintered body. The zirconia pre-sintered body was worked into the shapes shown in FIGS. 3A and 3B, FIGS. 4A and 4B, and FIGS. 5A and 5B (the dimensions in these figures are values after sintering), using a CAD/CAM system (KATANA® CAD/CAM system, manufactured by Kuraray Noritake Dental Inc.). The zirconia pre-sintered body was then fired at 1,550° C. for 120 minutes to fabricate a zirconia sintered body, using a furnace (Noritake KATANA® F-1; SK medical electronics Co., Ltd.). FIGS. 3A and 3B and FIGS. 4A and 4B show the zirconia sintered bodies of Examples 1 and 2. FIGS. 5A and 5B show the zirconia sintered body of Comparative Example 1. The zirconia sintered bodies all had a length of about 20 mm across the layers of first to fourth powders (a height of the column in Examples 1 and 2).

TABLE 1

|  | Yttria content (mol%) | Pigment content (mass%) | |
| --- | --- | --- | --- |
|  |  | NiO | (Zr, V)O₂ |
| First powder | 4 | 0 | 0 |
| Second powder | 4 | 0.001 | 0.003 |
| Third powder | 4 | 0.0035 | 0.007 |
| Fourth powder | 4 | 0.004 | 0.008 |

Example 3

A zirconia pre-sintered body and a sintered body were fabricated in the same manner as in Example 1, except that the base had a composite shape of a rectangle and a semicircle, as shown in FIG. 1D.

Confirmation of Deformation in Zirconia Sintered Body

The zirconia pre-sintered body fabricated in the manner described above was worked into the shapes shown in FIGS. 3A and 3B, FIGS. 4A and 4B, and FIGS. 5A and 5B (the dimensions in these figures are values after sintering), using a CAD/CAM system (KATANA® CAD/CAM system, manufactured by Kuraray Noritake Dental Inc.). The zirconia pre-sintered body was then fired at 1,550° C. for 120 minutes to fabricate a zirconia sintered body. FIGS. 3A and 3B and FIGS. 4A and 4B show the zirconia sintered bodies of Examples 1 and 2. FIG. 1D shows the base of the zirconia sintered body of Example 3. FIGS. 5A and 5B show the zirconia sintered body of Comparative Example 1. The columnar zirconia sintered body of Example 3 having the base shown in FIG. 1D had a height of about 20 mm (a height of the column).

The zirconia sintered body was mounted on a glass plate in such an orientation that the layers were parallel to the glass plate, and the maximum value of the gap between the glass plate and the zirconia sintered body was measured with a digital microscope (digital microscope KH-7700, manufactured by Hirox Co., Ltd.). The measured maximum value was used as an index for the evaluation of the amount of deformation that had occurred during firing. The zirconia sintered body was determined as being satisfactory (○) when the amount of deformation was 0.06 mm or less, and unsatisfactory (x) when the amount of deformation was more than 0.06 mm.

TABLE 2

| Specimen | Stem portion (minimum width) (mm) | Amount of deformation (mm) | Evaluation of deformation |
| --- | --- | --- | --- |
| Example 1 (Stem portion: Columnar) | 4.8 | 0.03 | ○ |
| Example 2 (Stem portion: Columnar) | 10.0 | 0.01 | ○ |

TABLE 2-continued

| Specimen | Stem portion (minimum width) (mm) | Amount of deformation (mm) | Evaluation of deformation |
|---|---|---|---|
| Example 3 (Stem portion: None) | — | 0 | ○ |
| Comparative Example 1 (Stem portion: Rod-shape) | 3.6 | 0.10 | × |

As shown in Table 2, the amount of deformation during firing was small in all of Examples 1, 2, and 3 representing zirconia sintered bodies of the present invention, demonstrating that deformation, as a whole, can be reduced even with the heat treatment performed for sintering. In contrast, firing caused deformation in the zirconia sintered body of Comparative Example 1, which was not columnar and had a smaller minimum width in the stem portion.

Confirmation of Percentage Reduction of Removed Material in Zirconia Sintered Body The percentage reduction (%) of removed material was 30.4%, 20%, and 5.4% in the zirconia sintered bodies of Examples 1, 2, and 3, respectively, compared to a quadrangular prism-shaped zirconia sintered body having no stem portion. The percentage reduction (%) of removed material was calculated as a volume reduction due to the shapes of the receding portions of Examples, in comparison with a quadrangular prism-shaped zirconia sintered body (40 mm×20 mm×40 mm) having no stem portion. It was confirmed that the zirconia sintered bodies of Examples 1, 2, and 3 have less material to be removed by milling, and require a shorter work time.

Confirmation of Shade of Zirconia Sintered Body (1)

The zirconia sintered bodies of a layered structure were fabricated into dental restorations (front tooth frames) using the method described below, and were visually inspected for comparative evaluation of their shades against the appearance of a natural tooth.

A molding material, or an impression material as it is also called, was used to take a negative imprint of an abutment tooth and its opposing tooth and surrounding dentition. A plaster was poured into the imprint to fabricate a positive plaster cast, in order to reproduce the abutment tooth and its opposing tooth and surrounding dentition. Thereafter, a wax was used to form a wax crown on the abutment tooth of the plaster cast, with adjusted occlusion, shape, and dimensions. The wax crown serves as the base of frame formation. This was followed by taking an optical scan of the abutment tooth and wax crown of the plaster cast with a KATANA® dental scanner D750 (manufactured by Kuraray Noritake Dental Inc.) to obtain three-dimensional digital data of the abutment tooth and wax crown. Instead of taking an optical scan of the plaster cast as in this example, an intraoral scanner may be used to directly take an intraoral optical scan. Instead of using a wax crown, three-dimensional data based on a virtual frame shape may be created using three-dimensional CAD software after taking an optical scan of the plaster cast.

The zirconia sintered body of Example 1 fabricated according to the method described above was used as a mill blank, and fabricated into a front tooth frame by shaping the mill blank using the three-dimensional data. Here, the mill blank was shaped with diamond burs (®=2.0 mm, 0=1.0 mm), using a high-speed milling machine CEREC MCXL manufactured by Dentsply Sirona.

The excess material on surfaces of the front tooth frame were removed with an electric machining tool coupled to diamond abrasive grains with a shaft. This was followed by sandblasting of the front tooth frame with 50 μm alumina under 0.2 MPa pressure to provide matte surfaces. The surfaces of the front tooth frame were then polished to gloss with PearlSurface® (manufactured by Kuraray Noritake Dental Inc.) to obtain a dental restoration made of the zirconia sintered body of Example 1.

The dental restoration obtained from the zirconia sintered body of Example 1 had a gradient of shades from pale white to pale yellow, from a region corresponding to the first layer derived from the first powder to a region corresponding to the fourth layer derived from the fourth powder, and looked similar to a natural tooth.

Confirmation of Shade of Zirconia Sintered Body (2)

The dental restoration made of the layered zirconia sintered body of Example 1 was quantitatively evaluated for its shades, as follows. The first to fourth powders (secondary powders) were individually fabricated into zirconia sintered bodies, and measured for (L*,a*,b*) in line with the L*a*b* color system (JIS Z 8781-4:2013, Color Measurements—Section 4: CIE 1976 L*a*b* color space). The (L*,a*,b*) of the individual zirconia sintered body fabricated from each powder correspond to the (L*,a*,b*) at each point of a zirconia sintered body fabricated from a laminate of the four powders. For the measurement of (L*,a*,b*), the individual zirconia sintered body produced from each powder was fabricated into a disc plate measuring 14 mm in diameter and 1.2 mm in thickness (both surfaces were polished, #600), and measured against a white background with a spectrophotometer CM-3610A, manufactured by Konica Minolta Inc. (D65 illuminant, measurement mode SCI, a diameter ratio of measurement area to illumination area=8 mm:11 mm). The evaluation results are presented in Table 3.

TABLE 3

| | | Yttria content (mol %) | Pigment content (mass %) | | Shade evaluation of sintered body | | |
|---|---|---|---|---|---|---|---|
| | | | NiO | (Zr,V)O$_2$ | L* | a* | b* |
| Example 1 | First powder | 4 | 0 | 0 | 89.5 | −1.1 | 0.6 |
| | Second powder | 4 | 0.001 | 0.003 | 88.0 | −0.8 | 4.3 |
| | Third powder | 4 | 0.0035 | 0.007 | 85.5 | −0.5 | 6.5 |
| | Fourth powder | 4 | 0.004 | 0.008 | 84.3 | 0.1 | 9.5 |

The zirconia sintered body of the present invention, appearing similar to a natural tooth as seen in shade confirmation (1), had the (L*,a*,b*) values shown in Table 3.

INDUSTRIAL APPLICABILITY

A zirconia pre-sintered body and a zirconia sintered body of the present invention can be used for dental restorations.

REFERENCE SIGNS LIST

1: Zirconia sintered body
9: Recessed portion
10: Base
11: Side face
12: Depression
13: Receding portion
14: Main body portion
15: Stem portion
16: Attachment
17: Narrow portion
P: One end
Q: Other end
A: First point
B: Second point
Y: First direction
L: Height of zirconia sintered body (columnar)

The invention claimed is:

1. A columnar zirconia sintered body suitable for making a dental restoration, the sintered body comprising:
   a base extending in an xy-plane having an x-axis for length and a y-axis for width; and
   a plurality of side faces extending orthogonally from the base along a z-axis as a height formed around a perimeter of the base, the plurality of side faces each having identical height:
   wherein the base comprises a main body portion and a stem portion,
   wherein the base has a surface shape, seen from a bottom and/or top plan view along the z-axis, that is neither square nor rectangular, but comprises a straight portion,
   wherein the surface shape comprises (i) a combination of a rectangle and a curved portion of the base extending along the x-axis in the xy-plane, or (ii) a first receding portion and a second receding portion defining a narrow portion, the main body portion being in contact with the narrow portion, the stem portion comprising the narrow portion, the stem portion having a smaller area than the main body portion at a region contacting the main body portion,
   wherein the main body portion and the stem portion, and the narrow portion in (ii) between the main body portion and stem portion, are comprised by the base,
   wherein the stem portion is as high as the main body portion in height across an entire length along the z-axis from the main body portion to an end of the stem portion,
   wherein the first and second receding portions in (ii) have a shape defined by recessed portions extending along the side faces along the z-axis, and
   wherein the stem portion has a minimum width, in the y-axis, of more than 4 mm.

2. The zirconia sintered body of claim 1, having a layered structure comprising a first layer and a second layer, laminated in a direction perpendicular to the base along the z-axis.

3. The zirconia sintered body of claim 1, wherein the base comprises a depression along the z-axis.

4. The zirconia sintered body of claim 3, wherein the depression has a depth that is at most 45% of a column height, and a maximum length of 12 mm or less at the base.

5. The zirconia sintered body of claim 1, wherein the surface shape of the base comprises the combination (i).

6. The zirconia sintered body of claim 5, wherein the curved portion is at least one selected from the group consisting of an arc, an ellipsoidal arc, a parabola, and a catenary.

7. The zirconia sintered body of claim 5, wherein the curved portion comprises an arc.

8. The zirconia sintered body of claim 5, wherein the curved portion comprises an ellipsoidal arc.

9. The zirconia sintered body of claim 5, wherein the curved portion comprises a parabola.

10. The zirconia sintered body of claim 5, wherein the curved portion comprises a catenary.

11. The zirconia sintered body of claim 1, wherein the main body portion has a maximum width of 20 mm or more, and
   wherein the stem portion has a minimum width of more than 4 mm.

12. The zirconia sintered body of claim 1, comprising zirconia and a stabilizer capable of inhibiting a phase transformation of zirconia,
   wherein the zirconia sintered body satisfies
   $L1$ is in a range of from 68.0 to 90.0,
   $a1$ is in a range of from −3.0 to 4.5,
   $b1$ is in a range of from 0.0 to 24.0,
   $L2$ is in a range of from 60.0 to 85.0,
   $a2$ is in a range of from −2.0 to 7.0,
   $b2$ is in a range of from 4.0 to 28.0,
   $L1 > L2$,
   $a1 < a2$, and
   $b1 < b2$,
   wherein $L1$, $a1$, and $b1$ are respectively $L^*$, $a^*$, and $b^*$ values in the $L^*a^*b^*$ color system as measured at a first point falling within an interval of a length from one end of the zirconia sintered body to 25% of the entire length of a straight line extending along a first direction from one end to the other end of the zirconia sintered body, and
   wherein $L2$, $a2$, and $b2$ are respectively $L^*$, $a^*$, and $b^*$ values in the $L^*a^*b^*$ color system as measured at a second point falling within an interval of a length from the other end of the zirconia sintered body to 25% of the entire length of the straight line, and
   wherein the $L^*$, $a^*$, and $b^*$ values show unchanging patterns of increase and decrease in a direction from the first point to the second point.

13. The zirconia sintered body of claim 12, wherein
   $L1-L2$ is in a range of from more than 0 to 12.0,
   $a2-a1$ is in a range of from more than 0 to 6.0, and
   $b2-b1$ is in a range of from more than 0 to 12.0.

14. The zirconia sintered body of claim 12, wherein the zirconia sintered body on the straight line connecting the first point and the second point comprises, in a direction from the first point to the second point,
   no interval in which the $L^*$ value increases by 1 or more,
   no interval in which the $a^*$ value decreases by 1 or more, and
   no interval in which the $b^*$ value decreases by 1 or more.

15. A dental restoration, comprising:
   the zirconia sintered body of claim 1.

16. The dental restoration of claim 15, comprising:
the zirconia sintered body with an attachment configured to be attached to a processing apparatus.

17. A zirconia pre-sintered body that, upon firing, becomes the zirconia sintered body of claim 1.

18. The zirconia sintered body of claim 1, wherein the stem portion has a trapezoidal shape, seen from a top and/or bottom plan view along the z-axis.

19. The zirconia sintered body of claim 1, wherein the stem portion has a square, rectangular, parallelogram, or trapezoidal shape, seen from a top and/or bottom plan view along the z-axis.

* * * * *